(12) United States Patent
Goo (10) Patent No.: US 12,105,886 B2
(45) Date of Patent: Oct. 1, 2024

(54) METHOD FOR RECOGNIZING NON-CONTACT GESTURES IN DISPLAY PROCESS AND DISPLAY DEVICE USING THE SAME

(71) Applicant: AHA CO., LTD., Gimpo-si (KR)

(72) Inventor: Gi Do Goo, Goyang-si (KR)

(73) Assignee: AHA CO., LTD., Gimpo-si (KR)

( * ) Notice: Subject to any disclaimer, the term of this patent is extended or adjusted under 35 U.S.C. 154(b) by 0 days.

(21) Appl. No.: 18/023,588

(22) PCT Filed: Feb. 2, 2023

(86) PCT No.: PCT/KR2023/001502
§ 371 (c)(1),
(2) Date: Feb. 27, 2023

(87) PCT Pub. No.: WO2023/204405
PCT Pub. Date: Oct. 26, 2023

(65) Prior Publication Data
US 2024/0231501 A1    Jul. 11, 2024

(30) Foreign Application Priority Data

Apr. 19, 2022  (KR) .................. 10-2022-0048217
Apr. 19, 2022  (KR) .................. 10-2022-0105346
Apr. 19, 2022  (KR) .................. 10-2022-0105347

(51) Int. Cl.
*G06F 3/042*    (2006.01)
*G06F 3/01*     (2006.01)

(52) U.S. Cl.
CPC ............ *G06F 3/017* (2013.01); *G06F 3/0421* (2013.01)

(58) Field of Classification Search
USPC ................ 715/863; 345/156–184; 250/341.8
See application file for complete search history.

(56) References Cited

U.S. PATENT DOCUMENTS

| | | | | |
|---|---|---|---|---|
| 2006/0010400 A1* | 1/2006 | Dehlin | .................. | G06V 40/28 715/856 |
| 2010/0295781 A1* | 11/2010 | Alameh | ................ | G06F 3/0346 345/158 |
| 2011/0084927 A1* | 4/2011 | Chang | ................ | G01R 27/2605 345/173 |

(Continued)

FOREIGN PATENT DOCUMENTS

| KR | 10-1190927 B1 | 10/2012 |
|---|---|---|
| KR | 10-2015-0007768 A | 1/2015 |

(Continued)

*Primary Examiner* — Rinna Yi
(74) *Attorney, Agent, or Firm* — Bridgeway IP Law Group, PLLC; Hyun Woo Shin (57) ABSTRACT

A method for recognizing a non-contact gesture includes: in a state where an infrared (IR) sensor array including a plurality of IR sensors and a plurality of infrared light emitting diodes (LEDs) emitting infrared rays are located above a display panel, when a specific IR sensor among the plurality of IR sensors recognizes an infrared signal reflected from a gesture object, acquiring, by a recognition system, information about the specific IR sensor; and recognizing, by the recognition system, a gesture of the gesture object based on the information on the specific IR sensor.

4 Claims, 4 Drawing Sheets

(56) References Cited

U.S. PATENT DOCUMENTS

| | | | | |
|---|---|---|---|---|
| 2014/0138545 | A1* | 5/2014 | Klinghult | G06F 3/0325 |
| | | | | 250/342 |
| 2016/0370861 | A1* | 12/2016 | Ikeda | G06F 3/017 |
| 2018/0032142 | A1* | 2/2018 | Oshima | G06F 3/0482 |
| 2023/0004214 | A1* | 1/2023 | Shcherbina | G06T 19/006 |
| 2023/0237831 | A1* | 7/2023 | Yamazaki | G06V 40/1318 |
| | | | | 382/124 |

FOREIGN PATENT DOCUMENTS

| | | | |
|---|---|---|---|
| KR | 10-1714302 | B1 | 3/2017 |
| KR | 10-2017-0052247 | A | 5/2017 |
| KR | 10-2372045 | B1 | 3/2022 |

\* cited by examiner

METHOD FOR RECOGNIZING NON-CONTACT GESTURES IN DISPLAY PROCESS AND DISPLAY DEVICE USING THE SAME

CROSS-REFERENCE TO RELATED APPLICATION

This application claims priority to and the benefit of Korean Patent Application Nos. 10-2022-0048217, 10-2022-0105346, and 10-2022-0105347 filed on Apr. 19, 2022, in the Korean Intellectual Property Office, the entire contents of which are incorporated herein by reference.

TECHNICAL FIELD

The present invention relates to a method for recognizing a non-contact gesture in a display process and a display device using the same, and more particularly, to a method for recognizing a non-contact gesture, including: in a state where an infrared (IR) sensor array including a plurality of IR sensors and a plurality of infrared light emitting diodes (LEDs) emitting infrared rays are located above a display panel, when a specific IR sensor among the plurality of IR sensors recognizes an infrared signal reflected from a gesture object, acquiring, by a recognition system, information about the specific IR sensor; and recognizing, by the recognition system, a gesture of the gesture object based on the information on the specific IR sensor.

DESCRIPTION OF THE RELATED ART

Recently, due to the influence of various social and economic factors, the use ratio of unmanned kiosks in general retail stores, banks, hotels, and the like has rapidly increased. In particular, it is predicted that the use rate of kiosks will further increase due to the expansion of coronavirus infection and awareness of the risk of infection.

However, since most kiosks that are currently distributed adopt a contact touch method, there is the possibility of transmission of viruses and the like through the kiosks. In particular, since the coronavirus can survive for about 120 hours on a glass surface and more than 72 hours on a plastic surface, the possibility of transmission of viruses by repeated contact may be very high.

In order to prevent the transmission of viruses through the contact, it has been required to control kiosks in a non-contact manner. In addition, there has been a need for a method capable of controlling kiosks in a non-contact manner. Accordingly, the inventors of the present invention propose a method for recognizing a non-contact gesture in a display process and a display device using the same.

DETAILED DESCRIPTIONS

Technical Problem

The present invention may have the following objects.

An object of the present invention is to perform a desired control operation without direct contact with a display.

In addition, an object of the present invention is to perform a desired control operation by accurately recognizing a non-contact gesture on a large-area display.

Furthermore, an object of the present invention is to set an operation pattern in advance so that an operation can be performed even with a simple gesture.

Technical Solution

According to an embodiment of the present invention, a method for recognizing a non-contact gesture includes: in a state where an infrared (IR) sensor array including a plurality of IR sensors and a plurality of infrared light emitting diodes (LEDs) emitting infrared rays are located above a display panel, when a specific IR sensor among the plurality of IR sensors recognizes an infrared signal reflected from a gesture object, acquiring, by a recognition system, information about the specific IR sensor; and recognizing, by the recognition system, a gesture of the gesture object based on the information on the specific IR sensor.

In addition, according to another embodiment of the present invention, a display device for recognizing a non-contact gesture includes: in a state where an infrared (IR) sensor array including a plurality of IR sensors and a plurality of IR light emitting diodes (LEDs) emitting infrared rays are located above a display panel, a communication unit; a database; and a processor configured to, when a specific IR sensor among the plurality of IR sensors recognizes an infrared signal reflected from a gesture object, acquire information about a specific IR sensor, and recognize a gesture of the gesture object based on the information about the specific IR sensor.

Advantageous Effects

According to the present invention, there are the following effects.

According to the present invention, there is an effect of performing a desired control operation without direct contact with a display (in a non-contact manner).

In addition, according to the present invention, there is an effect of performing a desired control operation by accurately recognizing a non-contact gesture on a large-area display.

Furthermore, according to the present invention, there is an effect of setting an operation pattern in advance so that an operation can be performed even with a simple gesture.

DETAILED DESCRIPTION OF THE EMBODIMENTS

Reference is made to the accompanying drawing which shows, by way of illustration, specific embodiments in which the present invention may be practiced. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it will be understood that the locations or arrangement of individual components in the disclosed embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained. Like reference numerals in the drawing refer to the same or similar functions throughout the various aspects.

Hereinafter, preferred embodiments of the present invention will be described in detail with reference to the accompanying drawing, so that those of ordinary skill in the art can easily carry out the present invention.

A non-contact gesture recognition process (recognition system) of the present invention may be performed in a process of installing an infrared light emitting diode (IR LED), an IR sensor, etc. in a display process platform, and specifically, may be performed in a process of testing whether non-contact gesture recognition is correct. In some cases, the recognition system 100 for performing non-contact gesture recognition according to the present invention may be considered as a platform included in a manufactured display device regardless of a display process.

In addition, the recognition system 100 of the present invention may acquire information from the IR sensor or the IR LED, which emits and senses infrared rays, and may recognize a gesture.

Figure 1:
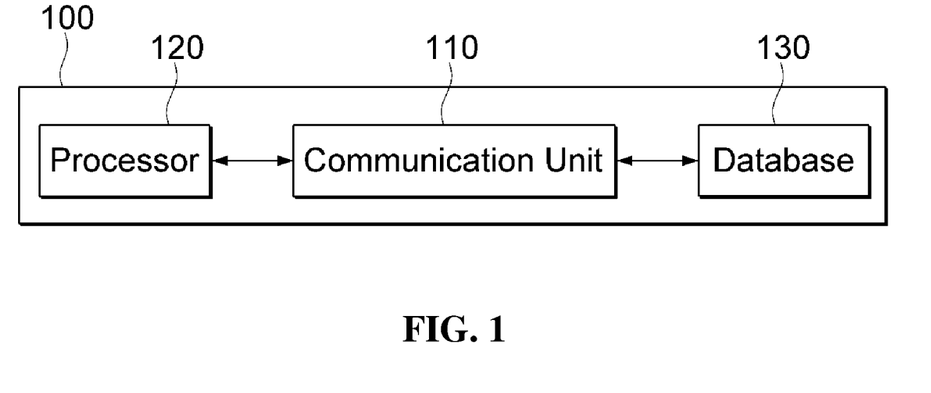
FIG. 1 is a diagram illustrating a schematic configuration of a recognition system according to an embodiment of the present invention.

FIG. 1 is a diagram illustrating the schematic configuration of the recognition system according to an embodiment of the present invention.

As illustrated in FIG. 1, the recognition system 100 of the present invention may include a communication unit 110, a processor 120, and a database 130. In some cases, unlike FIG. 1, the recognition system 100 of the present invention may not include the database 130.

The communication unit 110 of the recognition system 100 may be implemented by various communication technologies. That is, Wi-Fi (WIFI), Wideband CDMA (WCDMA), High Speed Downlink Packet Access (HSDPA), High Speed Uplink Packet Access (HSUPA), High Speed Packet Access (HSPA), Mobile WiMAX, WiBro, Long Term Evolution (LTE), 5G, 6G, Bluetooth, Infrared Data Association (IrDA), Near Field Communication (NFC), Zigbee, wireless LAN technology, and the like may be applied. In addition, in the case of connecting to the Internet and providing services, TCP/IP, which is a standard protocol for information transmission on the Internet, may be followed.

For reference, although the recognition system 100 is described, the recognition system 100 may correspond to a display device having a gesture recognition function and a display function.

The process performed by the processor 120 of the recognition system 100 of the present invention will be described with reference to FIGS. 2 and 3 below.

Figure 2:
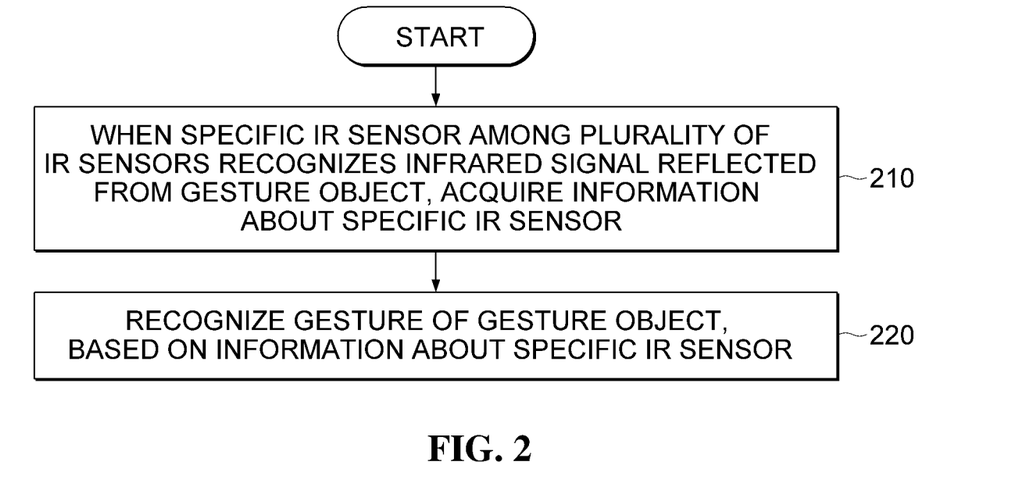
FIG. 2 is a diagram illustrating a process of recognizing a gesture according to an embodiment of the present invention.

FIG. 2 is a diagram illustrating a process of recognizing a gesture according to an embodiment of the present invention.

Figure 3:
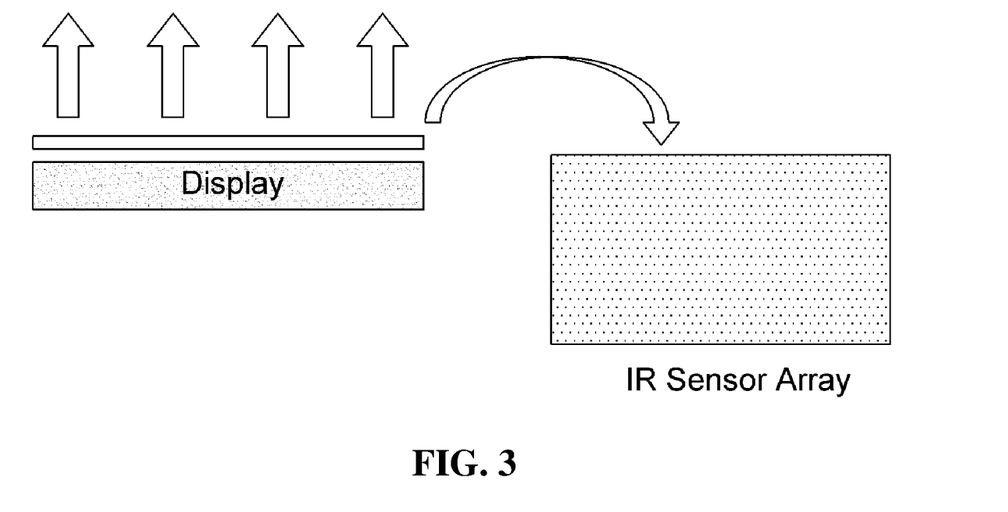
FIG. 3 is a diagram illustrating a display panel and an infrared (IR) sensor array according to an embodiment of the present invention.

FIG. 3 is a diagram illustrating a display panel and an IR sensor array according to an embodiment of the present invention.

As can be seen in FIG. 3, the IR sensor array including a plurality of IR sensors may be located above the display panel. In addition, a plurality of IR LEDs emitting infrared rays may also be located above the display panel, and may emit infrared rays toward the front of the display panel (in the direction of the arrow in FIG. 3).

That is, the IR sensor array, the plurality of IR LEDs, the display panel, and the like may be included in a display device (e.g., a kiosk device, etc.). The display device may recognize a non-contact gesture through the IR sensor array (IR sensor, etc.), the infrared LED, and the like.

For reference, a plurality of IR sensors may form an m×n structure in the IR sensor array. Since m represents a row and n represents a column, m×n IR sensors may exist in the IR sensor array.

In addition, the plurality of IR LEDs that emit infrared rays toward the front of the display panel may also be located in the IR sensor array. In some cases, the plurality of IR LEDS may be located between the IR sensor array and the display panel.

When there is no separate object in front of the display panel, the IR sensor may not recognize the reflected (infrared) signal because there is no object to reflect the infrared rays emitted from the IR LEDs. Conversely, when a separate object exists in front of the display panel, infrared rays emitted from the IR LED may collide with the separate object and be reflected, and the reflected signal may be recognized by the IR sensor.

When a specific IR sensor among the plurality of IR sensors recognizes the infrared signal reflected from the gesture object, the processor 120 of the recognition system 100 may acquire information about the specific IR sensor (S210).

The information about the specific IR sensor may include location information of the specific IR sensor. For example, the processor 120 of the recognition system 100 may acquire information about row p where the specific IR sensor is located and information about column q where the specific IR sensor is located.

As a result, the processor 120 of the recognition system 100 may recognize a touch position of the gesture object corresponding to the display panel through the location information of the specific IR sensor. This is because only the specific IR sensor among the plurality of IR sensors may recognize the infrared signal reflected from the gesture object.

Here, the gesture object may correspond to a means for controlling the operation of the display, such as a human finger.

In addition, the processor 120 of the recognition system 100 may recognize the gesture of the gesture object, based on the information about the specific IR sensor (e.g., the location information) (S220). The gesture is a non-contact motion that may be represented by the gesture object, and may include touch, click, movement, rotation, and the like. Hereinafter, a relationship between the IR sensor and various gestures will be described.

Figure 4:
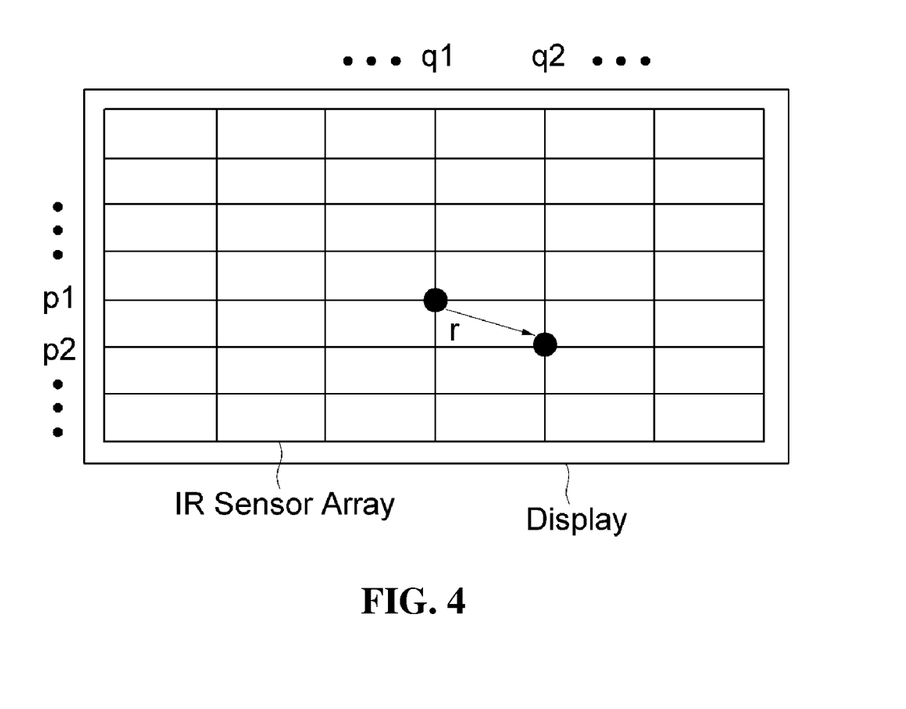
FIG. 4 is a diagram illustrating positions of a first specific IR sensor and a second specific IR sensor according to an embodiment of the present invention.

FIG. 4 is a diagram illustrating positions of a first specific IR sensor and a second specific IR sensor according to an embodiment of the present invention.

First, for convenience of description, it may be assumed that there are a plurality of specific IR sensors that recognize infrared signals reflected from a gesture object, and the plurality of specific IR sensors include at least a first specific IR sensor and a second specific IR sensor.

In addition, it may be assumed that a first time point at which an infrared signal (reflection) is recognized by the first specific IR sensor precedes a second time point at which an infrared signal is recognized by the second specific IR sensor. For reference, the first and second time points may each correspond to a time when the infrared signal is recognized after being in a state where the infrared signal is not recognized (a state where there is no gesture object).

In this case, the processor 120 of the recognition system 100 may acquire information about row p1 where the first specific IR sensor is located and information about column q1 where the first specific IR sensor is located, and may acquire information about row p2 where the second specific IR sensor is located and information about column q2 where the second specific IR sensor is located.

In addition, the processor 120 may recognize the movement direction and the movement distance of the gesture object corresponding to the movement input from a first point corresponding to p1 and q1 to a second point corresponding to p2 and q2.

As can be seen in FIG. 4, the processor 120 may identify the movement direction and the movement distance from the first point (p1, q1) where the first specific IR sensor is located to the second point (p2, q2) where the second specific IR sensor is located.

As a result, the processor 120 may recognize the movement input (gesture) from the first point (p1, q1) to the second point (p2, q2) of the display even if there is no direct contact of the gesture object (e.g., a finger), and the operation according to this may be implemented on the display.

However, according to an embodiment of the present invention, the distance between the first point and the second point may be longer than a predetermined distance.

At this time, the processor 120 of the recognition system 100 may recognize that there is a touch at the first point corresponding to p1 and q1, and may recognize that a touch exists at the second point corresponding to p2 and q2. That is, it may be recognized that the touch input has been made twice rather than the movement input (from the first point to the second point).

In addition, according to an embodiment of the present invention, the first time point at which the infrared signal (reflection) is recognized by the first specific IR sensor may correspond to the same time point as the second time point at which the infrared signal (reflection) is recognized by the second specific IR sensor.

At this time, the processor 120 of the recognition system 100 may determine that there is no touch on the display panel. That is, when there are two inputs at the same time, it may be recognized that there is no touch. In some cases, the processor 120 may recognize that the two touch inputs exist at the same time.

Figure 5:
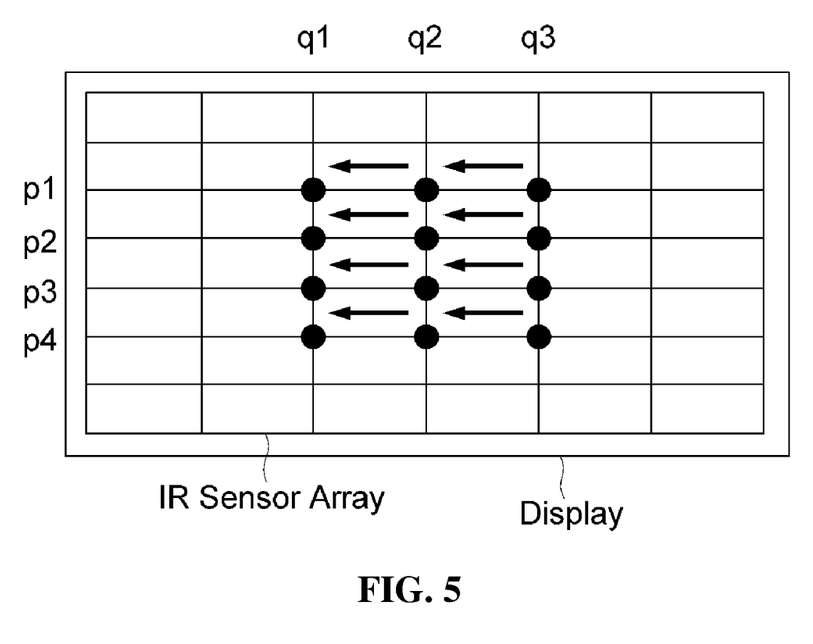
FIG. 5 is a diagram illustrating a pattern appearing in the IR sensor array according to an embodiment of the present invention.

FIG. 5 is a diagram illustrating a pattern appearing in the IR sensor array according to an embodiment of the present invention.

A preset pattern and a corresponding setting operation may be stored in the database 130. Here, the preset pattern may mean a temporal and positional pattern of reflected signals input to the plurality of IR sensors.

When it is determined that the pattern recognized based on the specific IR sensor and other IR sensors matches the preset pattern stored in the database 130, the processor 120 of the recognition system 100 may drive the stored setting operation.

Specifically, as can be seen in FIG. 5, a specific pattern in which reflected signals are acquired from IR sensors corresponding to four or more rows p1, p2, p3, and p4 along one column q3 and reflected signals are sequentially acquired from other two or more columns q1 and q2 and the same rows p1, p2, p3, and p4 adjacent to the left side of the column q3 may be recorded in the database 130, and the specific pattern may be matched with a setting operation of 'exit input' and stored in the database 130.

In such a state, when reflected signals are sequentially acquired from two or more other columns (e.g., {(p1, q2), (p2, q2), (p3, q2), (p4, q2)}→{(p1, q1), (p2, q1), (p3, q1), (p4, q1)}) to the left based on one column (e.g., (p1, q3), (p2, q3), (p3, q3), (p4, q3)), the processor 120 may determine that it matches the prestored specific pattern, and may operate the set 'exit input'.

Therefore, the user of the display device (e.g., kiosk) may perform an 'exit' operation of escaping from a specific screen through a gesture corresponding to a preset pattern (e.g., inputting with a palm and swiping to left), without having to click an exit button on the display.

As in FIG. 5, there is no problem when the specific pattern occurs in the central region of the IR sensor array, but the 'exit input' may not operate when the specific pattern occurs from the outer area. This is because when the specific pattern occurs in the central region of the IR sensor array, it may be sure that the user's intention is included, but when the specific pattern occurs in the outer region of the IR sensor array, the user may mistakenly express it while moving his or her hand.

Therefore, the processor 120 of the recognition system 100 may not operate the 'exit input' with respect to the specific pattern starting from the leftmost column or the rightmost column and progressing to two or more other adjacent columns among the plurality of IR sensors included in the IR sensor array (e.g., reflected signal recognition of four or more IR sensors included in each of three or more adjacent columns (based on the same row)).

As a result, whether to operate a preset pattern and a corresponding setting operation may be determined according to the position of the IR sensor included in the IR sensor array.

In addition, according to an embodiment of the present invention, the processor 120 may prestore the preset pattern for each user and the corresponding setting operation. That is, user information (e.g., name, age, etc.) and pattern/set operation may be matched and recorded in the database 130 in advance. This may be performed for regular users and the like.

For example, user A may set the specific pattern to 'exit', and user B may preset the specific pattern to 'confirm'. Accordingly, the processor 120 may drive different operations even if the same specific pattern is acquired.

In addition, in a state where the user does not separately set the pattern and the setting operation, the processor 120 may preset the pattern/setting operation for each age group of the user. For example, the specific pattern may be set to 'exit' for teenagers, and the specific pattern may be set to 'confirm' for persons in their 30s. As a result, even in the same specific pattern, different operations may be driven for each age group.

In addition, although not illustrated in the drawing, various patterns and various setting operations may be stored in the database 130. In this manner, the control operation may be performed on the screen of the actual display device (e.g., kiosk device).

Figure 6:
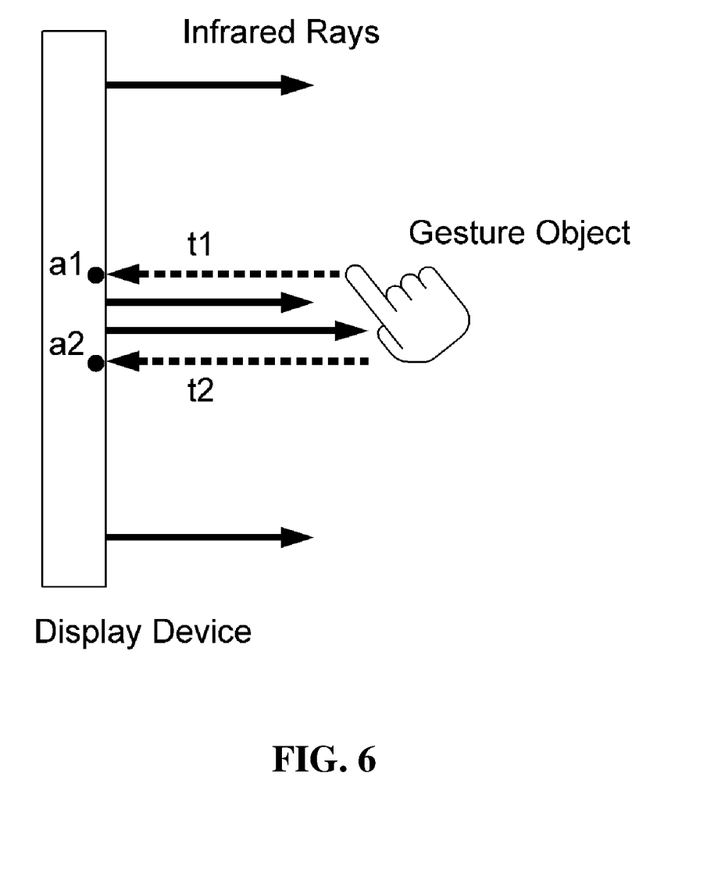
FIG. 6 is a diagram illustrating a distance between a display device and a gesture object according to an embodiment of the present invention.

FIG. 6 is a diagram illustrating a distance between a display device and a gesture object according to an embodiment of the present invention.

A certain amount of infrared rays may be continuously emitted toward the front of the display device from the IR LED included in the display device, and the IR sensor may recognize the reflected signal that collides with the gesture object. In this case, as the distance between the gesture object and the display device increases, the magnitude of the reflected signal may also decrease.

In such a situation, the processor 120 of the recognition system 100 may acquire information about the specific IR sensor when the infrared signal reflected from the gesture object is a predetermined value or more.

Referring to FIG. 6 together, it can be seen that, on the assumption that the gesture object is a human hand, a distance t2 between the display device and the wrist is longer than a distance t1 between the display device and the second finger. That is, the amount of the reflected signal input to the specific IR sensor a1 corresponding to the position of the second finger may be greater than the amount of the reflected signal input to the specific IR sensor a2 corresponding to the position of the wrist.

Since the gesture is recognized while acquiring information about the specific IR sensor only when the infrared signal reflected from the gesture object is greater than a predetermined value, the processor 120 may not recognize a gesture at the location of the wrist (specific IR sensor a2) and may recognize a gesture (e.g., touch, click, etc.) only at the location of the second finger (specific IR sensor a1).

In general, the infrared signal reflected from the gesture object within a predetermined distance (e.g. 10 cm) from the display device may be recognized through the IR sensor or the like, and gesture recognition may be difficult for the gesture object outside the predetermined distance.

On the other hand, the IR sensor array may include a plurality of IR sensors in a matrix form (m×n). At this time, the plurality of specific IR sensors instead of one specific IR sensor may recognize reflected infrared signals according to the size of the gesture object.

Considering this, each person's finger (gesture object) may have a different size, and the number of IR sensors recognizing infrared signals may also be different.

According to an embodiment of the present invention, the processor 120 of the recognition system 100 may acquire the user's gender or age in advance and predict the size of the finger based on the user's gender or age.

That is, in a state of dividing into a plurality of groups according to the size of the finger, an adult male may be set to be included in a first group in which the size of the finger is largest, and a female child may be set to be included in a second group in which the size of the finger is smallest.

At this time, when the user is determined to correspond to in the first group, the processor 120 may recognize the gesture of the gesture object based on some IR sensors (e.g., five IR sensors) located in the central portion (e.g., five IR sensors adjacent based on the center of gravity) among a plurality of IR sensors (e.g., nine IR sensors) that recognize infrared signals. This is because gestures such as touches may be overlapped by a large gesture object (e.g., an adult male).

In addition, when the user is determined to correspond to in the second group, the processor 120 may recognize the gesture of the gesture object by additionally taking into account other IR sensors (e.g., two IR sensors) adjacent based on a plurality of IR sensors (e.g., three IR sensors) that recognize infrared signals. This is because, in the case of a gesture object (e.g., a female child) having a too small area, the recognition of the touch or the like may not be performed properly.

The embodiments described above may represent the process of recognizing the non-contact gesture in the development of the display manufacturing process platform (test process) or the process of recognizing the non-contact gesture in the developed display device.

The embodiments according to the present invention may be implemented in the form of program instructions that can be executed through various computer components and may be recorded on a computer-readable recording medium. The computer-readable recording medium may include program instructions, data files, data structures, etc. alone or in combination. The program instructions recorded on the computer-readable recording medium may be those specially designed and configured for the present invention or those known to and usable by those skilled in computer software. Examples of the computer-readable recording medium may include hardware devices specially configured to store and execute program instructions, such as hard disk, read-only memory (ROM), random access memory (RAM), or flash memory. Examples of the program instructions may include not only machine language code generated by a compiler, but also high-level language code that is executable using an interpreter by a computer. The hardware device described above may be configured to operate as one or more software modules so as to perform the processes of the present invention, and vice versa.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

What is claimed is:

1. A method for recognizing a non-contact gesture, the method comprising:
   in a state where an infrared (IR) sensor array including a plurality of IR sensors and a plurality of IR light emitting diodes (LEDs) emitting infrared rays are located above a display panel,
   (a) when a specific IR sensor among the plurality of IR sensors recognizes an infrared signal reflected from a gesture object, acquiring, by a recognition system, information about a specific IR sensor; and
   (b) recognizing, by the recognition system, the non-contact gesture of the gesture object based on the information about the specific IR sensor, wherein the non-contact gesture includes at least one of: touch, click, movement, and rotation,
   wherein, in a state where the plurality of IR sensors form an m×n structure in the IR sensor array,
   the recognition system acquires information about row p where the specific IR sensor is located and information about column q where the specific IR sensor is located, and the recognition system recognizes a touch position of the gesture object corresponding to the display panel, wherein the touch position is a location of the gesture object adjacent to the display panel without physically contact, wherein, in a state where there are a plurality of specific IR sensors that recognize the infrared signal reflected from the gesture object and the plurality of specific IR sensors include at least a first specific IR sensor and a second specific IR sensor, when a first time point at which the infrared signal is recognized by the first specific IR sensor precedes a second time point at which the infrared signal is recognized by the second specific IR sensor, the recognition system acquires information about row p1 where the first specific IR sensor is located and information about column q1 where the first specific IR sensor is located, and acquires information about row p2 where the second specific IR sensor is located and information about column q2 where the second specific IR sensor, and the recognition system recognizes a movement direction and a movement distance of the gesture object corresponding to a movement input from a first point corresponding to the p1 and the q1 to a second point corresponding to the p2 and the q2, wherein, when a distance between the first point and the second point is longer than a predetermined distance, the recognition system recognizes that a first touch gesture exists at the first point corresponding to the p1 and the q1, and recognizes that a second touch gesture exists at the second point corresponding to the p2 and the q2, wherein, when a first time point at which the infrared signal is recognized by the first specific IR sensor is the same as a second time point at which the infrared signal is recognized by the second specific IR sensor, the recognition system determines that there is no touch gesture on the display panel, wherein, in a state where the preset pattern and a setting operation matched with a preset pattern are stored in the database, wherein the preset pattern is a temporal and positional pattern of reflected signals input to the plurality of IR sensors, after acquiring reflected signals from the IR sensors corresponding to row p1, row p2, row p3 and row p4 along column q3 corresponding to the preset pattern, when reflected signals are sequentially acquired from IR sensors corresponding to row p1, row p2, row p3 and row p4 along column q2 and IR sensors corresponding to row p1, row p2, row p3 and row p4 along column q1, the recognition system operates the setting operation, the recognition system sets the preset pattern corresponding to different setting operations based on a user's age.

2. The method of claim 1, wherein, in a state where a preset pattern and a corresponding setting operation are stored in a database, when it is determined that a pattern recognized based on the specific IR sensor and other IR sensors matches the preset pattern, the recognition system drives the setting operation.

3. The method of claim 1, wherein, when the infrared signal reflected from the gesture object is greater than or equal to a predetermined value, the recognition system acquires the information about the specific IR sensor.

4. A display device for recognizing a non-contact gesture, the display device comprising:

in a state where an infrared (IR) sensor array including a plurality of IR sensors and a plurality of IR light emitting diodes (LEDs) emitting infrared rays are located above a display panel, a communication unit;

a database; and a processor configured to, when a specific IR sensor among the plurality of IR sensors recognizes an infrared signal reflected from a gesture object, acquire information about a specific IR sensor, and recognize the non-contact gesture of the gesture object based on the information about the specific IR sensor, wherein the non-contact gesture includes at least one of: touch, click, movement, and rotation, wherein, in a state where the plurality of IR sensors form an mxn structure in the IR sensor array, the processor acquires information about row p where the specific IR sensor is located and information about column q where the specific IR sensor is located, and the processor recognizes a touch position of the gesture object corresponding to the display panel, wherein the touch position is a location of the gesture object adjacent to the display panel without physically contact, wherein, in a state where there are a plurality of specific IR sensors that recognize the infrared signal reflected from the gesture object and the plurality of specific IR sensors include at least a first specific IR sensor and a second specific IR sensor, when a first time point at which the infrared signal is recognized by the first specific IR sensor precedes a second time point at which the infrared signal is recognized by the second specific IR sensor, the processor acquires information about row p1 where the first specific IR sensor is located and information about column q1 where the first specific IR sensor is located, and acquires information about row p2 where the second specific IR sensor is located and information about column q2 where the second specific IR sensor, and the processor recognizes a movement direction and a movement distance of the gesture object corresponding to a movement input from a first point corresponding to the p1 and the q1 to a second point corresponding to the p2 and the q2, wherein, when a distance between the first point and the second point is longer than a predetermined distance, the processor recognizes that a first touch gesture exists at the first point corresponding to the p1 and the q1, and recognizes that a second touch gesture exists at the second point corresponding to the p2 and the q2, wherein, when a first time point at which the infrared signal is recognized by the first specific IR sensor is the same as a second time point at which the infrared signal is recognized by the second specific IR sensor, the recognition system determines that there is no touch gesture on the display panel, wherein, in a state where the preset pattern and a setting operation matched with a preset pattern are stored in the database, wherein the preset pattern is a temporal and positional pattern of reflected signals input to the plurality of IR sensors, after acquiring reflected signals from the IR sensors corresponding to row p1, row p2, row p3 and row p4 along column q3 corresponding to the preset pattern, when reflected signals are sequentially acquired from IR sensors corresponding to row p1, row p2, row p3 and row p4 along column q2 and IR sensors corresponding to row p1, row p2, row p3 and row p4 along column q1, the processor operates the setting operation, the processor sets the preset pattern corresponding to different setting operations based on a user's age.

* * * * *